US009740239B2

(12) United States Patent
Pombo et al.

(10) Patent No.: US 9,740,239 B2
(45) Date of Patent: Aug. 22, 2017

(54) SPRING-LOADED SUPPORTS FOR HEAD SET COMPUTER

(71) Applicant: Kopin Corporation, Westborough, MA (US)

(72) Inventors: Stephen A. Pombo, Campbell, CA (US); Jeffrey J. Jacobsen, Hollister, CA (US); Temujin W. Kuechle, Santa Cruz, CA (US); Raphael Hebert, Santa Cruz, CA (US); David Diepersloot, Scotts Valley, CA (US)

(73) Assignee: Kopin Corporation, Westborough, MA (US)

( * ) Notice: Subject to any disclaimer, the term of this patent is extended or adjusted under 35 U.S.C. 154(b) by 670 days.

(21) Appl. No.: 14/095,283

(22) Filed: Dec. 3, 2013

(65) Prior Publication Data

US 2014/0153173 A1 Jun. 5, 2014

Related U.S. Application Data

(63) Continuation of application No. 13/843,124, filed on Mar. 15, 2013.

(60) Provisional application No. 61/733,391, filed on Dec. 4, 2012, provisional application No. 61/750,266, filed on Jan. 8, 2013.

(51) Int. Cl.
*G06F 1/16* (2006.01)
*G02B 27/01* (2006.01)

(52) U.S. Cl.
CPC .......... *G06F 1/163* (2013.01); *G02B 27/0149* (2013.01); *G02B 27/0176* (2013.01); *G02B 2027/0138* (2013.01); *Y10T 29/49002* (2015.01); *Y10T 29/49117* (2015.01)

(58) Field of Classification Search
CPC ............ G02B 2027/014; G02B 27/017; G02B 2027/0178; G02B 27/0179; G02B 27/01; G06F 1/163
See application file for complete search history.

(56) References Cited

U.S. PATENT DOCUMENTS

| 4,571,746 A | 2/1986 | Gorike |
| 5,486,841 A | 1/1996 | Hara et al. |
| D375,495 S | 11/1996 | MacInness et al. |
| D380,482 S | 7/1997 | Shimasaki et al. |

(Continued)

OTHER PUBLICATIONS

International Search Report, issued in International Application No. PCT/US2013/072867, entitled "Spring-Loaded Supports for Head Set Computer," dated Sep. 1, 2014.

(Continued)

*Primary Examiner* — Marlon Fletcher
(74) *Attorney, Agent, or Firm* — Hamilton, Brook, Smith & Reynolds, P.C.

(57) ABSTRACT

In one embodiment, a head worn computer comprising a housing, wherein the housing includes at least one spring applying inward force to a user's head, a plurality of regions, the regions being able to be flexible regions or stiff regions, and two end regions, configured to wrap around a portion of the user's head, such that the two end regions are located at the front of the user's head, and each of the two end regions are on opposite sides of the user's head. In another embodiment, a method of configuring a head worn computer to a user, using the above mentioned head worn computer.

24 Claims, 7 Drawing Sheets

(56) References Cited

U.S. PATENT DOCUMENTS

| | | | |
|---|---|---|---|
| D383,455 S | 9/1997 | MacInness et al. | |
| 5,742,263 A * | 4/1998 | Wang | G02B 27/017 345/7 |
| D427,982 S | 7/2000 | Ishii | |
| D444,155 S | 6/2001 | Morooka et al. | |
| 6,421,031 B1 * | 7/2002 | Ronzani | G02B 27/017 345/8 |
| 6,560,029 B1 * | 5/2003 | Dobbie | G02B 23/125 2/6.1 |
| 6,654,966 B2 | 12/2003 | Rolla | |
| D538,269 S | 3/2007 | Tragatschnig | |
| D692,424 S | 10/2013 | Pombo et al. | |
| D702,234 S | 4/2014 | Pombo et al. | |
| D713,406 S | 9/2014 | Pombo et al. | |
| 9,417,660 B2 | 8/2016 | Pombo et al. | |
| 2002/0015008 A1 | 2/2002 | Kishida et al. | |
| 2004/0136522 A1 * | 7/2004 | Wurtz | H04M 1/6058 379/430 |
| 2005/0046549 A1 * | 3/2005 | Hoyle | A61F 9/04 340/309.16 |
| 2007/0089221 A1 * | 4/2007 | Manzella | A41D 13/0025 2/456 |
| 2009/0085833 A1 | 4/2009 | Otsuki | |
| 2009/0099836 A1 * | 4/2009 | Jacobsen | G06F 17/289 704/3 |
| 2009/0117890 A1 * | 5/2009 | Jacobsen | G02B 27/017 455/419 |
| 2009/0154719 A1 | 6/2009 | Wulff et al. | |
| 2009/0160737 A1 | 6/2009 | Wu et al. | |
| 2009/0243970 A1 | 10/2009 | Kato et al. | |
| 2009/0251409 A1 * | 10/2009 | Parkinson | G02B 27/017 345/156 |
| 2011/0004979 A1 * | 1/2011 | VanDerWoude | A41D 13/1153 2/422 |
| 2011/0085135 A1 * | 4/2011 | Bertolli | A61B 3/113 351/206 |
| 2011/0089207 A1 | 4/2011 | Tricoukes et al. | |
| 2011/0187640 A1 * | 8/2011 | Jacobsen | G02B 27/017 345/156 |
| 2011/0249122 A1 | 10/2011 | Tricoukes et al. | |
| 2012/0068914 A1 | 3/2012 | Jacobsen et al. | |
| 2012/0143020 A1 * | 6/2012 | Bordoley | A61B 5/1114 600/301 |
| 2012/0287284 A1 * | 11/2012 | Jacobsen | G06F 1/163 348/158 |
| 2013/0237146 A1 * | 9/2013 | Serota | G02B 27/017 455/12.1 |
| 2013/0285886 A1 * | 10/2013 | Pombo | G02B 27/0149 345/8 |
| 2013/0300649 A1 * | 11/2013 | Parkinson | G02B 27/017 345/156 |
| 2013/0326208 A1 * | 12/2013 | Jacobsen | G06F 9/4421 713/100 |
| 2014/0031001 A1 * | 1/2014 | Jacobsen | G02B 27/017 455/404.2 |
| 2014/0118250 A1 * | 5/2014 | Kim | G06F 3/0481 345/157 |
| 2014/0184801 A1 * | 7/2014 | Choi | H04N 7/185 348/158 |
| 2014/0187179 A1 * | 7/2014 | Ferguson | H01Q 3/24 455/77 |
| 2014/0233108 A1 * | 8/2014 | Cazalet | G02B 27/0176 359/630 |
| 2014/0270234 A1 * | 9/2014 | Beal | H04R 1/1025 381/74 |
| 2014/0320383 A1 * | 10/2014 | Goto | G02B 27/017 345/8 |
| 2014/0337621 A1 * | 11/2014 | Nakhimov | G06F 1/163 713/168 |
| 2015/0138224 A1 * | 5/2015 | Kim | G02B 27/0172 345/592 |
| 2015/0156803 A1 * | 6/2015 | Ballard | G02B 27/017 455/422.1 |
| 2015/0168727 A1 * | 6/2015 | Qaddoura | G02B 27/0172 345/156 |
| 2015/0173666 A1 * | 6/2015 | Smith | A61B 5/4064 600/301 |
| 2015/0220142 A1 * | 8/2015 | Parkinson | G06F 3/012 345/157 |
| 2015/0223355 A1 * | 8/2015 | Fleck | G06F 1/163 361/679.03 |
| 2015/0235426 A1 * | 8/2015 | Lyons | G02B 27/0172 345/8 |
| 2015/0241917 A1 * | 8/2015 | Seok | A61B 5/681 361/679.03 |
| 2015/0243068 A1 * | 8/2015 | Solomon | G02B 27/017 345/419 |
| 2015/0265161 A1 * | 9/2015 | Hernandez | A61B 5/0205 600/476 |
| 2015/0319546 A1 * | 11/2015 | Sprague | H04R 25/65 381/312 |
| 2016/0005233 A1 * | 1/2016 | Fraccaroli | G06T 19/006 345/633 |
| 2016/0007935 A1 * | 1/2016 | Hernandez | A61B 5/7278 600/301 |
| 2016/0026253 A1 * | 1/2016 | Bradski | G02B 6/34 345/8 |
| 2016/0026870 A1 * | 1/2016 | Wexler | G02B 27/0093 382/103 |
| 2016/0035136 A1 * | 2/2016 | Sendai | G06T 19/006 345/633 |

OTHER PUBLICATIONS

International Preliminary Report on Patentability, International Application No. PCT/US2013/036403, filed on Apr. 12, 2013, "Collapsible Head Set Computer," dated Oct. 28, 2014.

International Preliminary Report on Patentability, International Application No. PCT/US2013/072867, filed on Dec. 3, 2013, "Spring-Loaded Supports for Head Set Computer," dated Jun. 9, 2015.

Notification and Transmittal of the International Search Report and Written Opinion of PCT/US2013/036403 dated Jul. 3, 2013.

* cited by examiner

FIG. 6B

SPRING-LOADED SUPPORTS FOR HEAD SET COMPUTER

RELATED APPLICATIONS

This application claims the benefit of U.S. Provisional Application No. 61/733,391, filed Dec. 4, 2012, and U.S. Provisional Application No. 61/750,266, filed on Jan. 8, 2013. This application also is a continuation of U.S. application Ser. No. 13/843,124, filed on Mar. 15, 2013, now U.S. Pat. No. 9,417,660, and International Application No. PCT/US2013/036403, filed on Apr. 12, 2013, which both claim the benefit of U.S. Provisional Application No. 61/733,391.

The entire teachings of the above applications are incorporated herein by reference.

BACKGROUND OF THE INVENTION

A head mounted computer includes a display and is mounted to a user's head to enable the user to view the display. The display shows images to the user which can be generated by, for example, the head mounted computer, anther computer, or a remote device. The user can control the head mounted computer or another remote device, which in turn affects the images shown on the display.

SUMMARY OF THE INVENTION

Head worn computers can be bulky systems and typically require adjustment of a series of straps or stabilizers to mount the computer on a user's head. Therefore, an embodiment of the present invention is a head worn computer that may be rapidly mounted or dismounted. In one embodiment, the head worn computer provides a housing which includes at least one spring, the at least one spring applies an inward force which allows the head worn computer to clamp to the user's head.

In an embodiment, the inward force applied can be adjusted by a designer selecting a spring with a different stiffness constant. The inward force of any particular spring with any particular stiffness constant can be determined by Hook's law, F=kx. In an embodiment, a user can open the head worn computer and replace the spring(s) with springs of a different stiffness constant, for instance, to adjust for a different sized head.

In an example embodiment, the present head worn computer can include a housing. The housing can include at least one spring applying an inward force to a user's head. The housing also includes a plurality of regions, each of the regions can be flexible regions or stiff regions. The housing also includes two end regions. The head worn computer of the present invention is configured to wrap around a portion of the user's head, such that the two end regions are located at the front of the user's head and each of the two end regions are on opposite sides of the user's head. The housing of the head worn computer may be supported by the back of the user's head.

In another embodiment, the housing may include a first flexible region and a second flexible region. The first flexible region may be located between a center of the housing and a first stiff region. The second flexible region may be located between the first stiff region and a second stiff region.

In another embodiment, the first flexible region may provide greater inward force than the second flexible region.

In another embodiment, the housing can also include a central processing printed circuit board (CPUPCB), which includes a central processing unit (CPU) that is operatively coupled to a first near field communications (NFC) module. The NFC module is located in a first of the plurality of regions. An auxiliary printed circuit board (AUXPCB) can include one or more auxiliary modules operatively coupled to a second NFC module. The second NFC module can be located in a second of the plurality of regions. The first and second NFC modules may be configured to establish an NFC link.

In another embodiment, the head worn computer of the present invention may further comprise at least one mount attached to the end regions of the housing.

In another embodiment, the mount may be configured to mount an accessory. The accessory may include at least one of a camera, sensor, microphone, display, and illumination device.

In another embodiment, the mount may include at least one joint.

In another embodiment, the first plurality of regions may be adjacent to the second plurality of regions.

In another embodiment, a method of configuring a head worn computer to a user can include providing a housing. The housing can include at least one spring applying an inward force to the user's head. The housing also includes a plurality of regions. Each of the regions can be flexible regions or stiff regions. The housing can also include two end regions. The head worn computer of the present method may be configured to wrap around a portion of the user's head such that the two end regions located at the front of the user's head and each of the two end regions are on opposite sides of the user's head.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Figure 1:
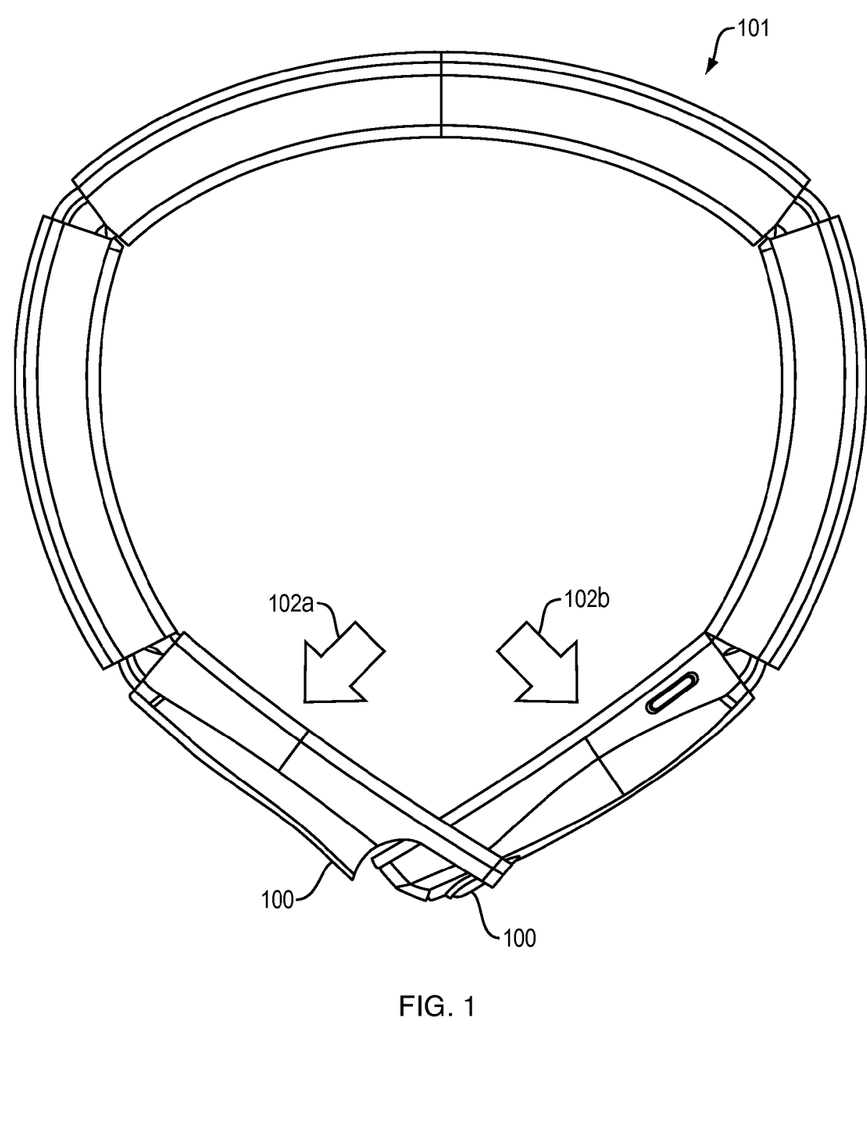
FIG. 1 is a diagram illustrating a top-down view of an example head worn computer in a partially folded state.

FIG. 1 is a diagram illustrating a top-down view of an example head worn computer in a partially folded state. The head worn computer is comprised of a housing 101, which terminates in two end regions 100. The housing may be constructed of a plastic or metal material which encloses all or part of a spring. The spring provides an inward force directed towards a user's head. To open the head worn computer from its partially folded state, the user can apply a force in the direction of arrows 102a-b. In the present example embodiment, a first end 100 rests on top of a second end 100 when in a partially folded state. In another embodiment, the second end 100 may rest on top of the first end 100.

Figure 2:
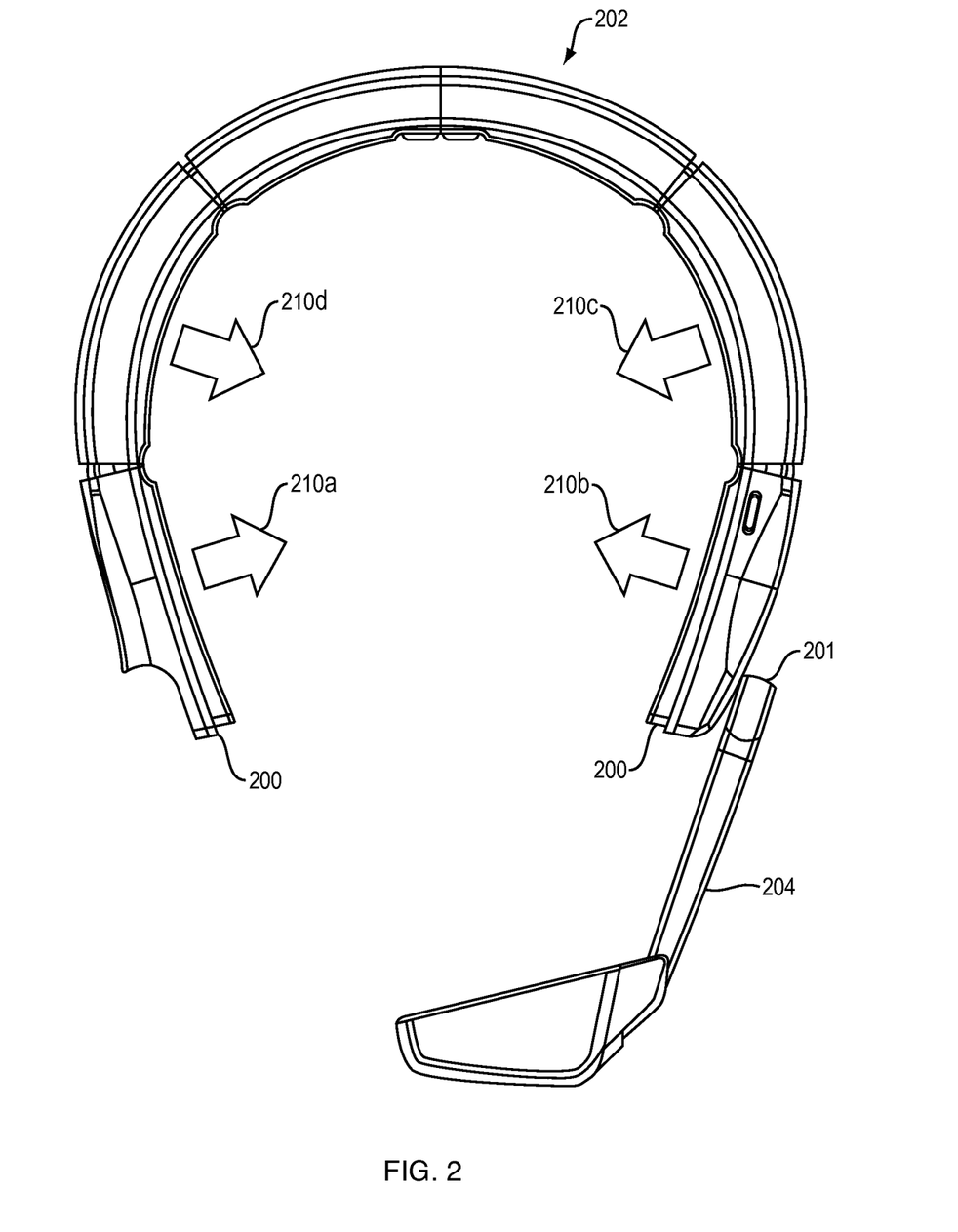
FIG. 2 is a diagram illustrating an example embodiment of a head worn computer configured to the head of a user.

FIG. 2 is a diagram illustrating an example embodiment of a head worn computer configured to the head of a user. The housing 202 rests and remains stationary against the back of the user's head. When worn on a user's head, the springs exert an inward force in a direction indicated by arrows 210a-d. The inward force secures the computer to the user's head. Along the inside surface of the housing adjacent to the user's head while the user is wearing the head worn computer, padding may be attached to provide comfort to the user. One or more speakers may be attached to the housing, for example, along the outside surface of the housing. The speakers may rotate up to 220°. Providing and enabling more than one speaker may provide the user with stereo audio.

Further, one or both end regions 200 may include a mount 201. The mount 201 may be used to attach accessories, such as a camera, a microphone, a sensor, an illumination device, or a display. Further, the mounts on each of the end regions can also provide a setup for a strap mount, which can secure the headset computer to the user's head in a more effective manner.

The mount 201 may also include at least one pivot and/or joint to allow the user to adjust the angle or location of the accessory attached to the mount. The head worn computer is mounted with a display 203 attached to an arm 204. The display, as well as other accessories, can flip 180°. Flipping the display or accessory allows the user to flip the entire head worn computer and position an accessory on the opposite side of the user's head. This, for example, provides the user with the freedom to shift the display from left eye to right eye, or vice versa, without the need to disconnect and reconnect the display to the opposite mount.

Figure 3:
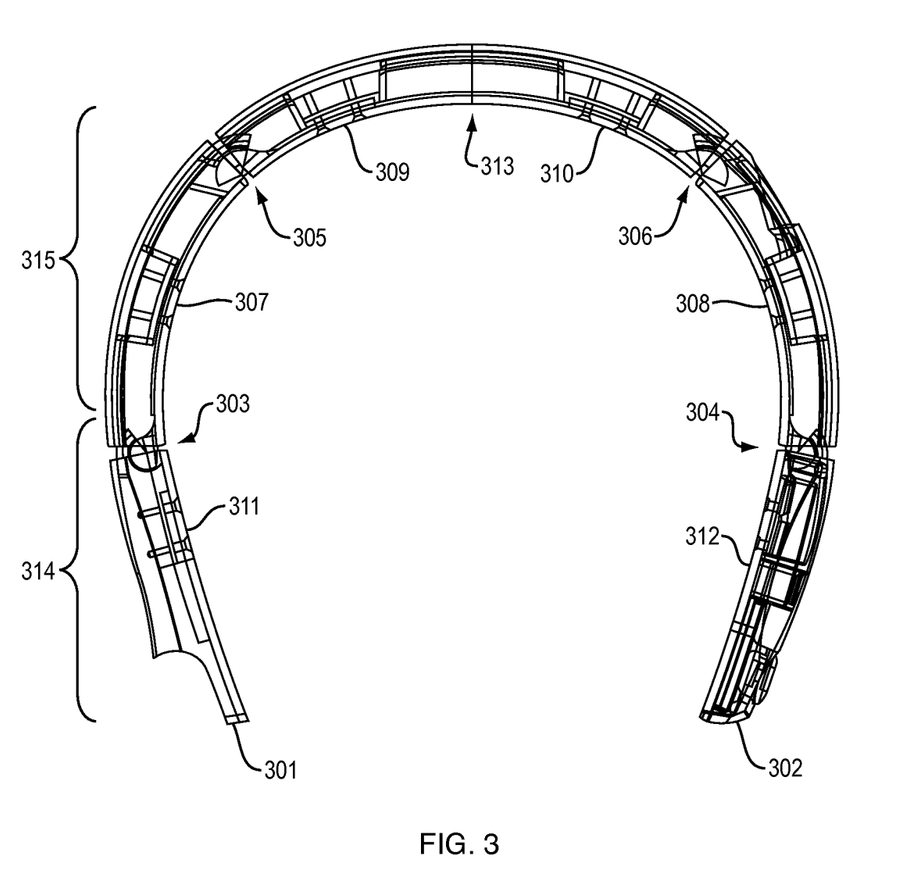
FIG. 3 is a diagram illustrating a cross-section of an example embodiment of a head worn computer.

FIG. 3 is a diagram illustrating a cross-section of an example embodiment of a head worn computer. The head worn computer in FIG. 3 includes flexible regions 303-305, stiff regions 307-312, and two end regions 301-302. Each flexible region 303-305 includes a spring. The springs of each flexible region 303-305 produce an inward force directed towards a user's head. The head worn computer may employ multiple springs or it may use one spring to provide a desired amount of inward tension/force.

A plurality of regions may include at least one flexible region and/or at least one stiff region, or, a plurality of regions may include multiple flexible regions and/or multiple stiff regions. A first of the plurality of regions 314 and a second of the plurality of regions 315 can each include at least one flexible region and at least one stiff region.

Further, the head worn computer includes two sets of flexible regions. A first set of flexible regions 305 and 306 are one spring length away from the center of the housing 313. As a result, the first set of flexible regions 305 and 306 apply a large force to the head. This force allows the head worn computer to be secured to the user's head. The second set of flexible regions 303 and 304, however, are one spring length away from the first set of flexible regions 305 and 306, and two spring lengths away from center of the housing 313. The second set of flexible regions 303 and 304 exerts less force than a single spring in isolation because the second set is two spring lengths from the center of the housing 313. The second set of flexible regions 303 and 304, therefore, apply less force than the first set of flexible regions 305 and 306. In this example embodiment, when worn by the user, the end regions 301 and 302 rest near the front of the user's head, above the ear. The second set of flexible regions 303 and 304 apply less force than the first flexible regions 305 and 306 to prevent discomfort to the user.

Further, in an example embodiment, a near field communication (NFC) link may be installed in one of the plurality of regions. For example, within the first of the regions 314, a central processing printed circuit board (CPUPCB) including a central processing unit (CPU) coupled to a first near field communications (NFC) module may be installed. Adjacent to, or otherwise within range of, the first of the regions 314, a second of the regions 315 may have an auxiliary printed circuit board (AUXPCB) including one or more auxiliary modules operatively coupled to a second NFC module. The first NFC module and the second NFC module may be configured to establish an NFC link. Within each of the remaining pluralities of regions, a NFC module and corresponding electronics modules (e.g. CPUPCB, CPU, or AUXPCB) may be installed. Each NFC module in each region may be configured to establish an NFC link.

Figure 4A:
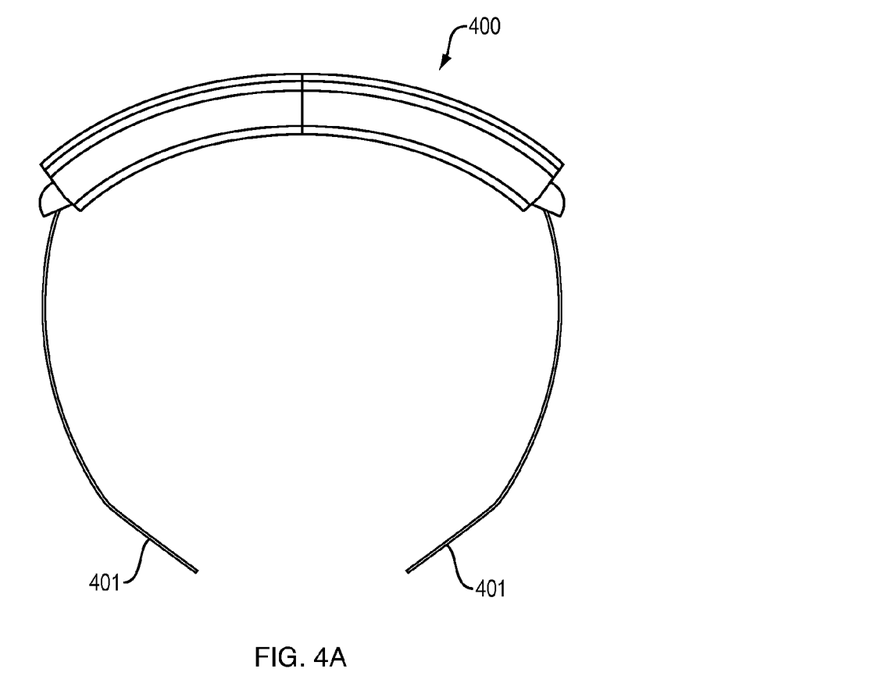
FIG. 4A is a diagram illustrating an example embodiment of springs that may be located within the housing of the head worn computer.

FIG. 4A is a diagram illustrating an example embodiment of springs 401 that may be located within the housing 400 of the head worn computer. In FIG. 4A, the springs 401 are shown removed from the regions of the housing that contain the springs 401.

Figure 4B:
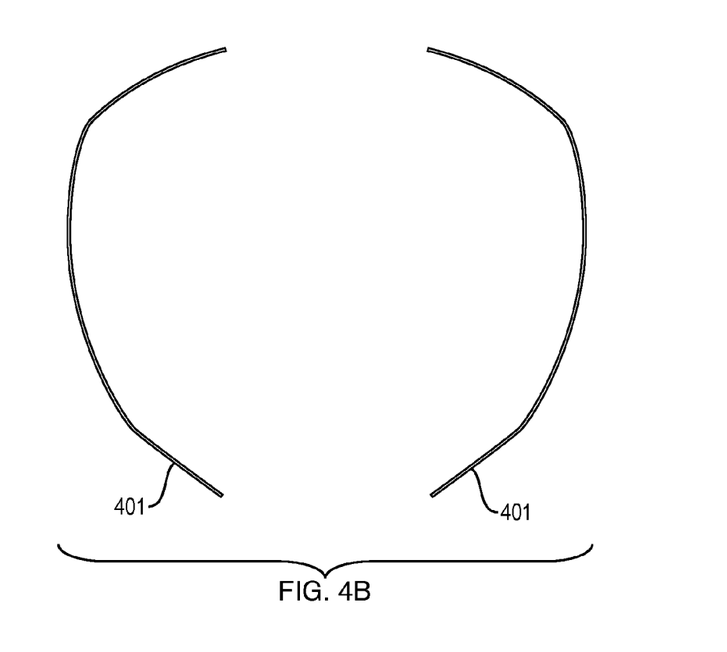
FIG. 4B is a diagram illustrating an example embodiment of springs in isolation.

FIG. 4B is a diagram illustrating an example embodiment of springs 401 in isolation. In FIG. 4B, the springs 401 are shown removed from the housing entirely.

Figure 5:
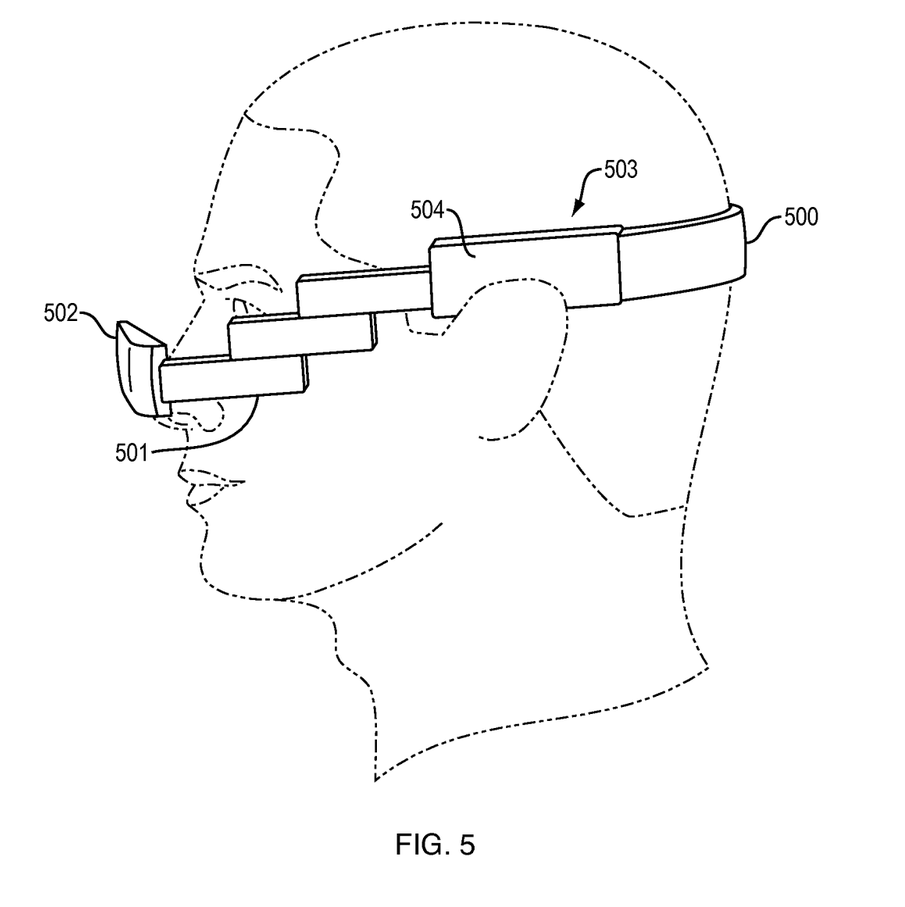
FIG. 5 is an illustration of an example embodiment of the head worn computer worn on the head of a user.

FIG. 5 is an illustration of an example embodiment of the head worn computer worn on the head of a user. The housing 500 rests on the back of the user's head and remains stationary. End region 503 rests above the user's ear, close to the temple at the front of the user's head. In an example embodiment, the end region includes a mount 504. A display 501 may be attached to the mount 504. The display 501 can be positioned directly in front of the user's eye 502.

Figure 6A:
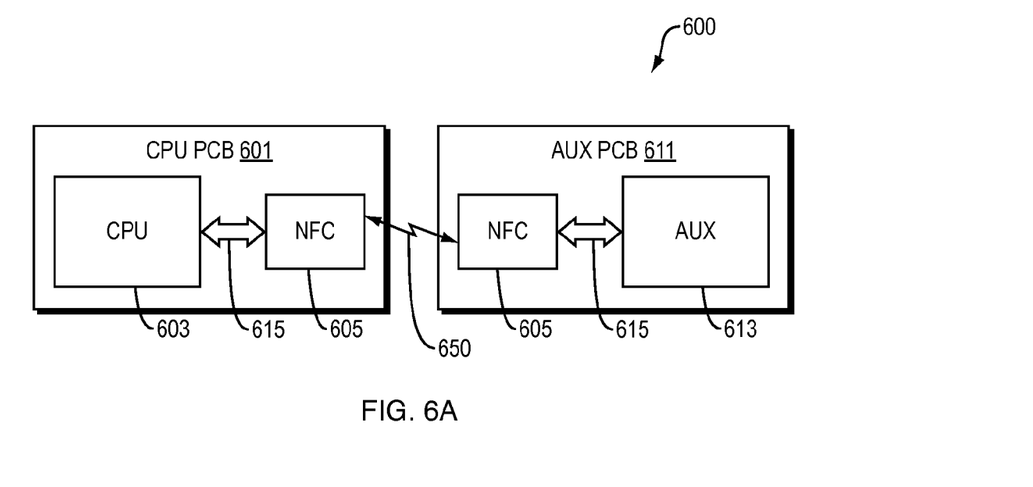
FIGS. 6A-6B are block diagrams illustrating electrical circuits employing near field communication to transfer data between electronics modules of a head worn computer.
Figure 6B:
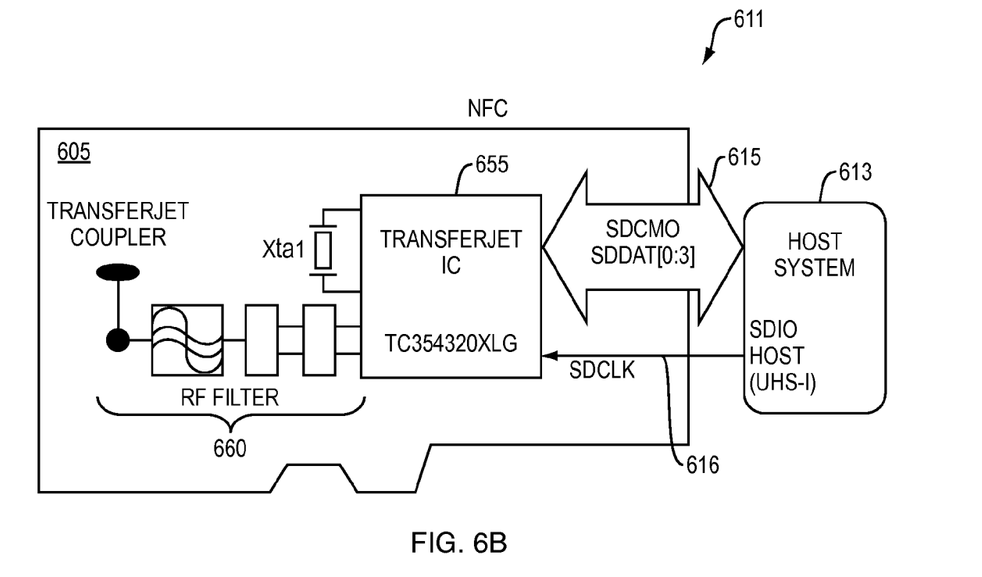

FIGS. 6A and 6B are block diagrams 600 and 611 of electrical circuits employing near field communication to transfer data between electronics modules of a head worn computer.

Near field communications (NFC) is a set of standards for establishing radio communications between devices by touching the devices or bringing them into close proximity, usually no more than a few centimeters. Smartphones and similar devices currently employ NFC technology. Present applications include contactless transactions, data exchange, and simplified setup of more complex communications, such as Wi-Fi. Communication is also possible between an NFC device and an unpowered NFC chip, called a "tag".

Recent developments in NFC technology have enabled near-field high speed data transfer, including, for example, a "near-field high speed data transfer technology" (e.g., 375 Mb/sec.). Such NFC technology can be used for convenience in mobile devices; consumers find such high speed downloads or data transfer rates useful for transferring files, particularly for large files, such as movies. The Toshiba Transfer Jet is a NFC technology that provides wireless near-field high speed data transfer, can operate up to a distance of 3.5 centimeters, and has a near-field radiated power dissipation level that is similar to very low power near-field Bluetooth power levels. The Transfer Jet is available from Toshiba America Electronic Components, Inc., 19900 MacArthur Boulevard, Suite 400, Irvine, Calif.

NFC modules can be employed as an interface to provide near-field high speed wireless data transfer to interface between electronics modules or printed circuit boards (PCBs) (also referred to herein as printed circuit board assemblies (PCBAs)). In general, PCBs are used to mechanically support and electrically connect electronic components using conductive pathways, tracks, or signal traces etched from copper sheets laminated onto a non-conductive substrate. Multiple PCBs are typically interconnected using large multi-wire busses or, sometimes, vias are used for "stacked" configurations or for multi-layer boards.

The PCBs of the head worn computers can be equipped with NFC modules. The NFC modules can replace the large multi-wire busses and vias used to interface between multiple PCBs. The NFC module equipped PCBs can be arranged in a stacked configuration (e.g., the PCB connected in a parallel configuration) or placed end-to-end (e.g., the PCBs connected in a series configuration). NFC modules allow the PCBAs to be placed in a thinner or lower profile stack because the volume needed to fit large multi-pin PCBA to PCBA connectors is no longer required.

In either arrangement of PCBs is used, a first NFC module is located within a NFC range of a second NFC module to enable an interfacing wireless communications link between the two NFC modules. An example NFC range, such as the Transfer Jet, is up to 3.5 centimeters, although the data transmit and reception range can be controlled by system software. Control of operating NFC ranges may be based on particular use and application to optimize a feature of system performance, such as transfer rate or battery life.

For embodiments of a head worn computer that use two or more NFC interfaces, when the NFC module is used for high speed data transfer between the head worn computer and another device, such as a Smartphone or another head worn computer, application software (or operating system instructions) can select a single or multiple NFC modules as the data transfer point to interface with the other device.

For practical purposes, PCBAs can be sealed to the outside having only a power and/or ground external connection. By equipping individual head down computer PCBAs with NFC modules, the PCBAs (including the NFC modules) can be more easily hermetically sealed, because there are large number of external connection points of the multi-wire busses and vias have been eliminated. Thus, higher levels of system reliability and system life-span are possible because exposure to dust and moisture are greatly reduced.

NFC modules allow the PCBAs to move or flex within the physical constraints of a system architecture or industrial design free from the possibility of physical damage associated with the multi-wire busses, flex circuit interfaces, or connectors becoming loose or making intermittent contact during vibration or other PCBA to PCBA movement.

Using near field wireless high speed data transfer technology can eliminate large multiple pin connectors on two or more adjoining PCBAs, as well as any high speed multiple wire data bus or flex circuit interfaces. Eliminating the sharp right angle connection of PCBAs to PCBAs and the speed multi-wire bus or cables from PCBA to PCBA can improve and lower high speed system EMI and regional RF emission certifications.

Thus, use of PCBs equipped with NFC modules may allow head worn computers to employ hinges, system housing flex points, and flexible or stiff regions in its industrial design and be freed from the problems of passing large multi-wire busses or flex circuits interfaces through or about the hinges or flex points.

FIG. 6A is block diagram of circuit 600, an example embodiment of PCBs equipped with NFC modules arranged to be within the near field range of each other and configured to establish a communications link. The circuit 600 includes a central processing unit printed circuit board assembly 601 (CPU PCB) and an auxiliary printed circuit board assembly 611 (AUX PCB). CPU PCB 601 includes a central processing unit 603 (CPU) communicatively coupled 615 to an NFC module 605. The CPU 603 can be, for example, an OMAP4430 multimedia application processor available from Texas Instruments Inc., 12500 TI Boulevard Dallas, Tex. For reasons of simplicity, details of the CPU PCB 603 have been omitted, including, but not limited to: a power companion chip, battery connector, camera connector, USB on-the-go micro-AB connector, PCB temperature sensor, display connector, debug connector, status LEDs, user switches, etc. and communications pathways, such as traces, wires, etc. As such, the CPU PCB 603 can include any or more of these details.

The AUX PCB 611 includes an auxiliary module 603 (AUX) communicatively coupled 615 to an NFC module 605. NFC modules 605 are arranged in close proximity, that is, within an operable near field range of one another.

Further, the NFC modules are configured to establish a bi-directional wireless communications link 650. Such a bi-directional wireless communications link 650 can be established using any appropriate NFC protocol and/or data exchange format. Although not shown in FIG. 6A for reasons of simplicity, the AUX PCB 611 can include multiple AUXs 613, such as an audio codec and mini-DSP module, head tracker module, micro-SD card, power regulators, GPS receivers, wireless communications modules employing protocols such as Wi-Fi, Bluetooth, etc., eMMC embedded storage. The AUX PCB 611 can not only include additional AUXs 613, such as those listed above, but also include communications pathways, such as traces, wires, etc. that enable operable coupling.

FIG. 6B is a schematic diagram of the AUX PCB 611 showing more details of the NFC module 605. The AUX PCB 611 includes the AUX module 613, operable coupling 615, and NFC module 605. The NFC module 605 can include NFC integrated circuit (NFC IC) 655 and radio frequency (RF) circuit 660.

Figure 7A:
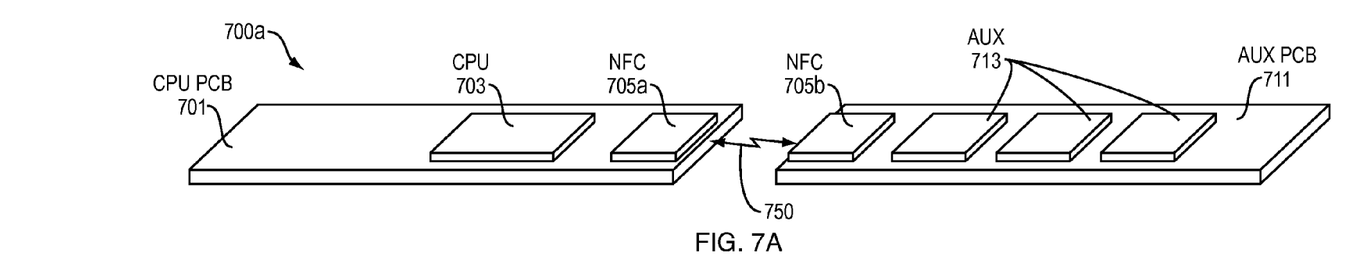
FIGS. 7A-7C are block diagrams illustrating example arrangements of PCBs equipped with NFC modules.
Figure 7B:
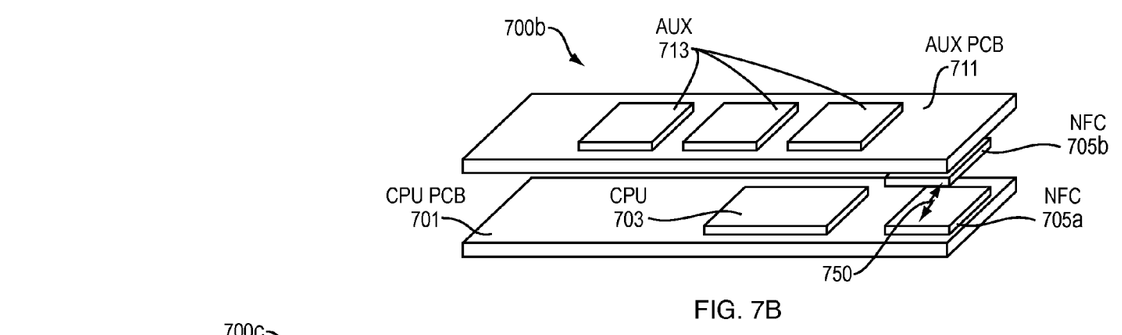
Figure 7C:
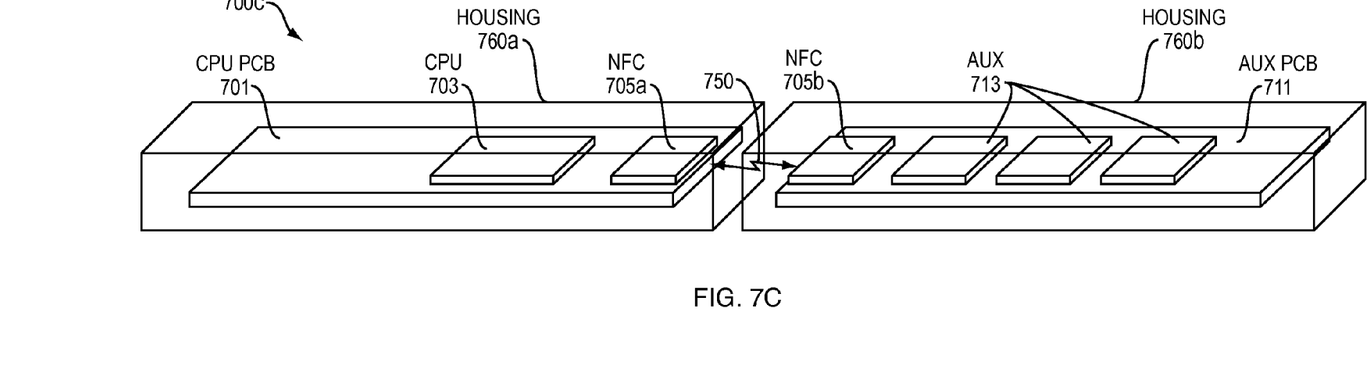

FIGS. 7A-7C are block diagrams illustrating example arrangements of PCBs equipped with NFC modules.

FIG. 7A is a block diagram illustrating an example embodiment of a series arrangement 700a (also referred to as end-to-end) of PCBs including CPU PCB 701 and AUX PCB 711. The CPU PCB 701 includes the CPU 703 and NFC module 705a. The AUX PCB 711 includes multiple AUXs 713 and NFC module 705b. The NFC modules 705a-b are arranged to be positioned at an end of their respective PCBs. In other words, a first NFC module 705a is located at an end, near the edge of the CPU PCB 701 and a second NFC module 705b is located at an end, near an edge of the AUX PCB 711. The CPU PCB 701 and AUX PCB 711 are arranged such that the location of each respective NFC module 705a-b is located within the near field range of its respective communications link partner to enable the wireless transfer of data through communications link 750.

FIG. 7B is a block diagram illustrating an example embodiment of a parallel arrangement 700b (also referred to as stacked) of PCBs including CPU PCB 701 and AUX PCB 711. Similar to FIG. 7A, the CPU PCB 701 includes the CPU 703 and NFC module 705a, and the AUX PCB 711 includes multiple AUXs 713 and NFC module 705b. Unlike the series arrangement 700a, the in parallel arrangement 700b the NFC 705b of AUX PCB 711 is mounted on the underside so as to enable the NFC modules 705a-b to be located within the near field range of each other.

FIG. 7C is a block diagram illustrating an example embodiment of a series arrangement 700c of PCBs, including CPU PCB 701 and AUX PCB 711, that is similar to series arrangement 700a but for the CPU PCB 701 and AUX PCB 711 each being encased in a housing 760a-b, respectively. The housings 760a-b should be designed to enable the NFC modules 705a-b to be located within the near field range of each other in at least one operational position.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A head worn computer comprising:
   a housing, wherein the housing includes:
   at least one spring applying inward force to a user's head,
   a plurality of regions, the regions being able to be flexible regions or stiff regions, the regions being arranged to be co-planar,
   a first end region including a display unit; and
   a second end region;
   wherein the first and second end region are co-planar or parallel to the plane of the plurality of regions;
   wherein the head worn computer is configured to wrap around a portion of the user's head, such that the two end regions are located at the front of the user's head, and each of the two end regions being on opposite sides of the user's head.

2. The head worn computer of claim 1, wherein the housing is supported by the back of the user's head.

3. The head worn computer of claim 1, wherein the housing includes a first flexible region and a second flexible region.

4. The head worn computer of claim 3, wherein the first flexible region is located between a center of the housing and a first stiff region.

5. The head worn computer of claim 4, wherein the second flexible region is located between the first stiff region and a second stiff region.

6. The head worn computer of claim 4, wherein the first flexible region provides greater inward force than the second flexible region.

7. The head worn computer of claim 1, further comprising:
   a central processing printed circuit board (CPUPCB) including a central processing unit (CPU) operatively coupled to a first near field communications (NFC) module, the first NFC module located in a first of the plurality of regions; and
   an auxiliary printed circuit board (AUXPCB) including one or more auxiliary modules operatively coupled to a second NFC module, the second NFC module located in a second of the plurality of regions;
   wherein the first and second NFC modules are configured to establish an NFC link.

8. The head worn computer of claim 7, further comprising at least one mount, the at least one mount attached to one of the end regions of the housing.

9. The head worn computer of claim 8, wherein the at least one mount is configured to mount an accessory.

10. The head worn computer of claim 9, wherein the accessory includes at least one of a camera, sensor, microphone, display, and illumination device.

11. The head worn computer of claim 8, wherein the at least one mount includes at least one joint.

12. The head worn computer of claim 7, wherein the first plurality of regions and second plurality of regions are adjacent.

13. A method of configuring a head worn computer to a user, the method comprising:
   providing a housing, wherein the housing includes at least one spring applying an inward force to the user's head, a plurality of regions, the regions being able to be flexible regions or stiff regions, the regions being arranged to be co-planar, and two end regions being co-planar or parallel to the plane of the plurality of regions;
   wherein a first of the two end regions includes a display unit; and
   wherein the head worn computer is configured to wrap around a portion of the user's head, the two end regions located at the front of the user's head, and each of the two ends being on opposite sides of the user's head.

14. The method of claim 13, wherein the housing is supported by the back of the user's head.

15. The method of claim 13, wherein the housing includes a first flexible region and a second flexible region.

16. The method of claim 15, wherein the first flexible region is located between a center of the housing and a first stiff region.

17. The method of claim 16, wherein the second flexible region is located between the first stiff region and a second stiff region.

18. The method of claim 17, wherein the first flexible region provides greater inward force than the second flexible region.

19. The method of claim 13, further comprising:
   operatively coupling a central processing printed circuit board (CPUPCB) including a central processing unit (CPU) to a first near field communications (NFC) module, the first NFC module located in a first of the plurality of regions; and
   operatively coupling an auxiliary printed circuit board (AUXPCB) including one or more auxiliary modules to a second NFC module, the second NFC module located in a second of the plurality of regions;
   wherein the first and second NFC modules are configured to establish an NFC link.

20. The method of claim 19, further comprising at least one mount, the at least one mount attached to one of the end regions of the housing.

21. The method of claim 20, wherein the at least one mount is configured to mount an accessory.

22. The method of claim 21, wherein the accessory includes at least one of a camera, sensor, microphone, display, and illumination device.

23. The method of claim 20, wherein the at least one mount includes at least one joint.

24. The method of claim 19, wherein the first plurality of regions and second plurality of regions are adjacent.

\* \* \* \* \*